United States Patent
Quach et al.

(10) Patent No.: US 6,453,427 B2
(45) Date of Patent: *Sep. 17, 2002

(54) METHOD AND APPARATUS FOR HANDLING DATA ERRORS IN A COMPUTER SYSTEM

(75) Inventors: Nhon T. Quach, San Jose; John W. C. Fu, Saratoga; James O. Hays, San Jose; Valentin Anders, San Jose; Sorin Iacobovici, San Jose; Alberto J. Munoz, Los Altos, all of CA (US); Dean A. Mulla, Fort Collins, CO (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/224,380

(22) Filed: Dec. 31, 1998

(51) Int. Cl.$^7$ .............................. G06F 11/00; G06F 11/10
(52) U.S. Cl. ............................................. 714/6; 711/122
(58) Field of Search ........................... 714/6, 799, 758, 714/704, 48, 52; 711/119, 122; 709/1; 370/242

(56) References Cited

U.S. PATENT DOCUMENTS

| | | | |
|---|---|---|---|
| 4,358,848 A | * 11/1982 | Patel | |
| 5,263,032 A | * 11/1993 | Porter et al. | |
| 5,649,090 A | * 7/1997 | Edwards et al. | |
| 5,845,326 A | * 12/1998 | Hirayama et al. | |

* cited by examiner

Primary Examiner—Gopal C. Ray
(74) Attorney, Agent, or Firm—David J. Kaplan

(57) ABSTRACT

An uncorrectable error is detected in the data of a computer system. The erroneous data is allowed to be stored in first and second caches of the computer system while the system runs first and second processes, the first process being associated with the data. The first process is terminated when an attempt is made to load the data from the cache. Meanwhile, the second process continues to run.

20 Claims, 3 Drawing Sheets

METHOD AND APPARATUS FOR HANDLING DATA ERRORS IN A COMPUTER SYSTEM

The present invention relates to computer systems and more particularly to error detection of data stored in a memory region and handling by a processor.

BACKGROUND

Computer systems, from handheld electronic devices to medium-sized mobile and desktop systems to large servers and workstations, are becoming increasingly pervasive in our society. Each computer system includes one or more processors. A processor manipulates and controls the flow of data in a computer. Improving processor reliability and data integrity tends to improve the overall quality of the computer. Processor designers employ many different techniques to achieve these goals to create more robust computers for consumers.

One reliability problem arises from occurrences known as soft errors. A soft error is a situation in which a bit is set to a particular value in the processor, and the bit spontaneously changes to the opposite value, thereby making the associated data erroneous. A soft error may be caused by cosmic rays passing through a storage element within the processor. These rays may charge or discharge the storage element, causing a stored bit to change its value.

As processor supply voltages continue to be reduced in an effort to reduce device geometry to increase speed and packing density, the difference in voltage values that define the 1's and 0's of bits is reduced as well. This makes processors more susceptible to soft errors. In addition, as storage elements become more densely packed within processors, the likelihood of a soft error increases.

One way to combat soft errors is through the use of error correction code (ECC). ECC detects errors in data, and in some cases is able to correct those errors. For example, one type of ECC is capable of correcting single bit errors, but can only detect double bit errors (and cannot correct them).

Because ECC is limited in its ability to correct multi-bit errors, ECC typically relies on the computer system software or hardware to take the necessary precautions when the ECC detects an uncorrectable, multi-bit error in data. For example, upon detecting uncorrectable, erroneous data, the ECC causes a system-wide reset which terminates all processes and shuts down the system. This is done to prevent the uncorrectable, erroneous data from corrupting the rest of the system.

SUMMARY OF THE INVENTION

In accordance with an embodiment of the present invention, an uncorrectable error is detected in the data of a computer system. The erroneous data is allowed to be stored in first and second caches of the computer system while the system runs first and second processes, the first process being associated with the data. The first process is terminated when an attempt is made to load the data from the cache. Meanwhile, the second process continues to run.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

Data is entered into an ECC unit in a memory region of a computer system. A multi-bit, uncorrectable error is detected by the ECC unit, and the erroneous data is stored in the memory region. Meanwhile, multiple processes continue to run on the system.

The erroneous data is subsequently loaded into a cache of the computer system, and from there, one of the processes attempts to load the data into the register file of the processor. The processor detects the error in the erroneous data, and, in response, stores the address of the erroneous data in an error log register and asserts a machine check abort (MCA).

The MCA causes the processor to call a MCA handler. The MCA handler accesses the error log register and instructs the operating system of the computer system to terminate one or more processes that include the address of the erroneous data in their address space. Meanwhile, one or more other processes continue to run on the computer system.

As used herein, the terms "transferred", "read", and "loaded" may be used interchangeably. In addition, the term "process" includes a program being run on one or more processors of a computer (e.g. having its instructions executed by one or more processors of the computer) or a thread of a program being run on the computer. A more detailed description of embodiments of the present invention, including various configurations and implementations, is provided below.

Figure 1:
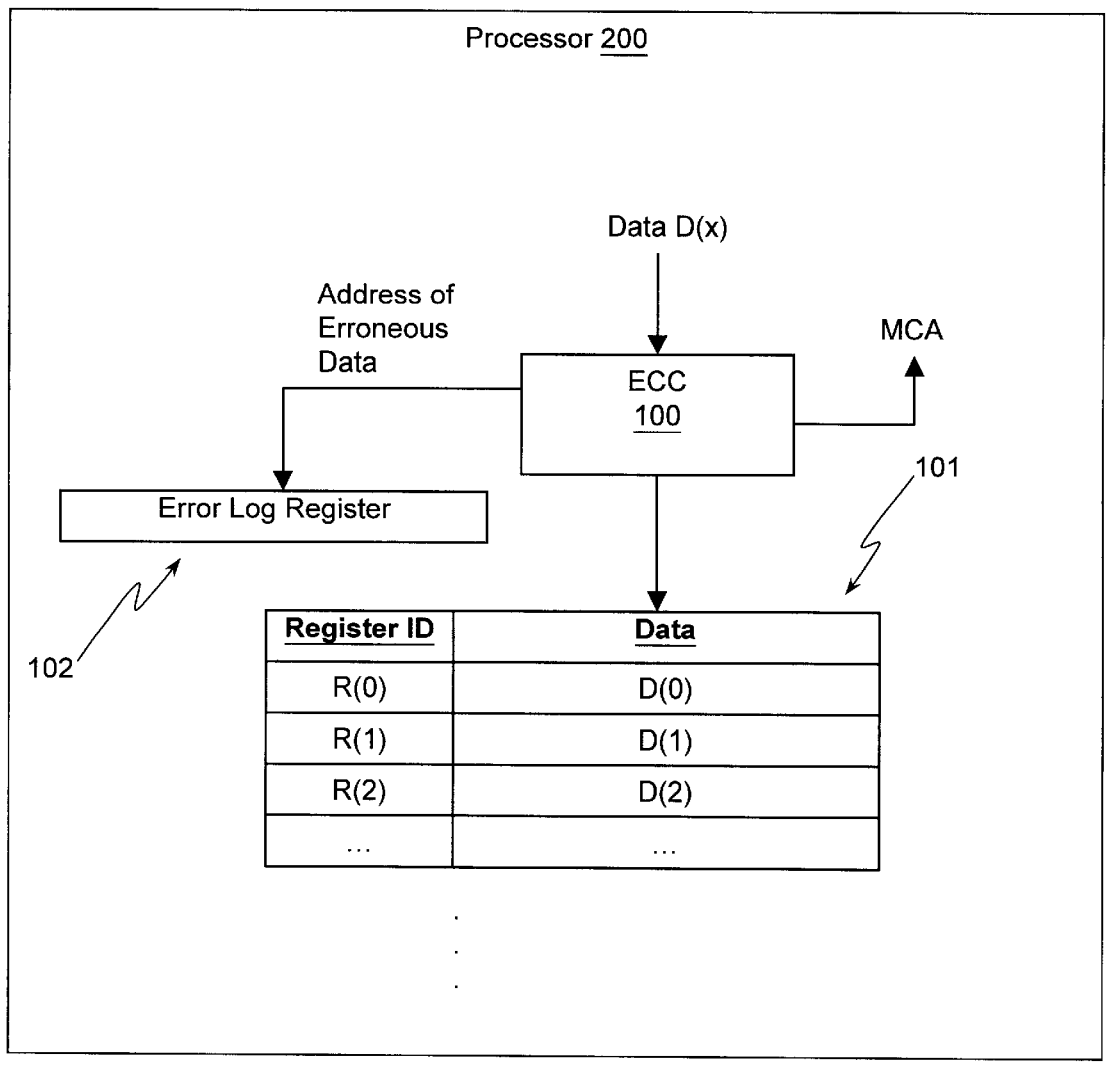
FIG. 1 is a processor formed in accordance with an embodiment of the present invention.

FIG. 1 is a processor formed in accordance with an embodiment of the present invention in which data D(x) is provided to an input of ECC unit 100 of processor 200. Data D(x) may be of any length, including, for example, a bit, byte, word, line, block, or page. Data D(x) may originate from any of a number of different memory regions of the computer system. For example, for one embodiment, data D(x) is provided to ECC unit 100 from a cache that is internal (e.g. on-chip) to processor 200. This may include an L0, L1, or L2 cache. Alternatively, data D(x) may be provided to ECC unit 100 from an external cache (e.g. an off-chip cache) such as an L2 or L3 cache. For another embodiment, data D(x) may originate from the main memory of the computer system.

Data D(x) is provided to ECC unit 100 of FIG. 1 in response to a process running on processor 200 requesting a load of data D(x). Before data D(x) is loaded into register file 101, the data is checked for errors. For an alternate embodiment of the present invention, data D(x) is checked for errors by ECC unit 100 in response to data D(x) being transferred into a cache of processor 200 from, for example, a lower level cache or main memory of the computer system.

For one embodiment of the present invention, ECC unit 100 of FIG. 1 corrects single bit errors in data D(x), and detects double or other multi-bit errors. For an alternate embodiment, the ECC unit may additionally correct double or other multi-bit errors, and detect triple or other more severe multi-bit errors. As used herein, errors that the ECC unit can detect but not correct are referred to as "uncorrectable" errors.

If ECC unit 100 of FIG. 1 detects a correctable error in data D(x), the error is corrected and data D(x) is forwarded to register file 101 for storage. If, however, ECC unit 100 detects an uncorrectable error in data D(x), such as a double bit error, the address of the erroneous data is entered into error log register 102 and an MCA is asserted. The erroneous data D(x) is not loaded into register file 101.

Processor 200 of FIG. 1, in response to the assertion of the MCA, calls an MCA handler. An MCA handler is a software sequence that accesses error log register 102, and instructs the operating system to terminate a process associated with the erroneous data address stored in the error log register. For example, the MCA handler may instruct the operating system to terminate any process having an address space that includes the address of the erroneous data D(x) stored in error log register 102.

For one embodiment of the present invention, the MCA handler may be a micro-code sequence residing on processor 200 of FIG. 1 or on another integrated circuit of the computer system. For another embodiment, the MCA handler may be a firmware sequence residing in a non-volatile memory region of the computer system, such as the BIOS. For yet another embodiment of the present invention, the MCA handler may be a software sequence residing in a memory region of the computer system.

Although the process or processes associated with the address of the erroneous data is terminated, other process or processes running on the computer system continue to run. In this manner, the overall computer system is not unduly burdened by the detection of an uncorrectable ECC error, as is the case with the prior art. Only the process(es) that risk being corrupted by the erroneous data are terminated.

Figure 2:
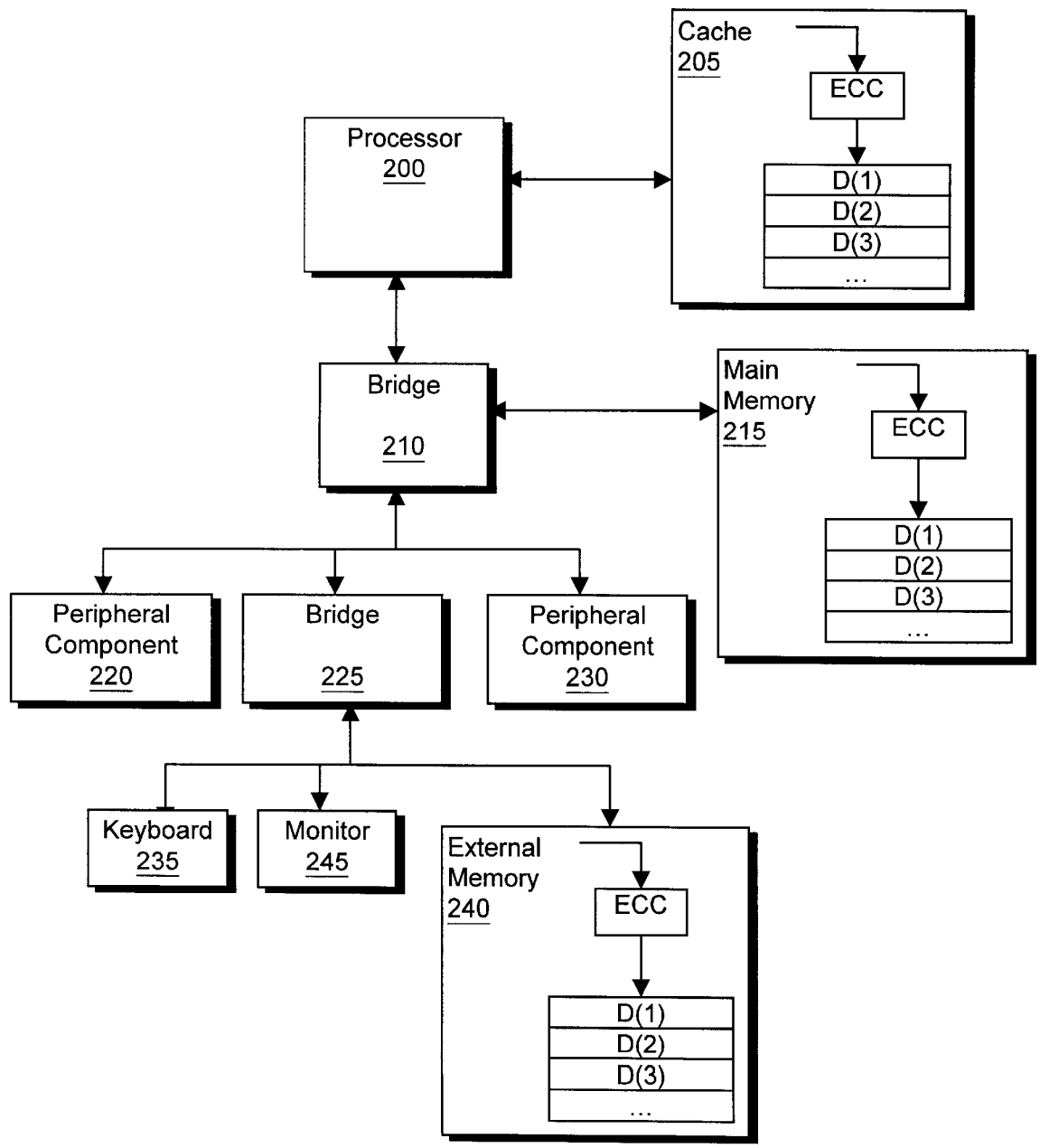
FIG. 2 is a computer system formed in accordance with an embodiment of the present invention.

FIG. 2 is a computer system formed in accordance with an embodiment of the present invention including processor 200 described above in conjunction with FIG. 1. Cache 205 and bridge 210 are coupled to processor 200. Bridge 210 is used to couple processor 200 to main memory 215 and to peripheral components 220 and 230. Bridge 225 couples keyboard 235, external memory 240, and monitor 245 to bridge 210.

Peripheral components 220 and 230 of FIG. 2 may include audio and video input/output devices such as audio/video generators, accelerators, or analyzers. External memory 240 may include a hard drive, floppy disk, tape drive, DVD-ROM, or other non-volatile, machine-readable, storage medium.

Processor 200, as described above, cache 205, main memory 215, and external memory 240 of FIG. 2 all include an ECC unit to detect or correct ECC errors. If data containing an uncorrectable error is first stored in cache 205, the ECC unit of cache 205 detects the error, but stores the data anyway. If this data is not used, it may be evicted to the next lower level of the memory hierarchy, which, for the embodiment of FIG. 2, is main memory 215, but may alternatively be a lower level of cache. The ECC unit of memory 215 also detects the error and also stores the data notwithstanding the error.

After the erroneous data is stored in main memory 215 of FIG. 2, the data may be subsequently read back into a higher level memory such as cache 205, another off-chip (i.e. external) cache, or a cache within processor 200. From this higher level memory, processor 200, under control of a process associated with the address of the erroneous data, may attempt to load the data into a register file. This results in an ECC error detection, logging of the data address in the error log register, and an MCA assertion within processor 200, as described above. Meanwhile, unassociated processes may continue to be executed normally by processor 200.

Figure 3:
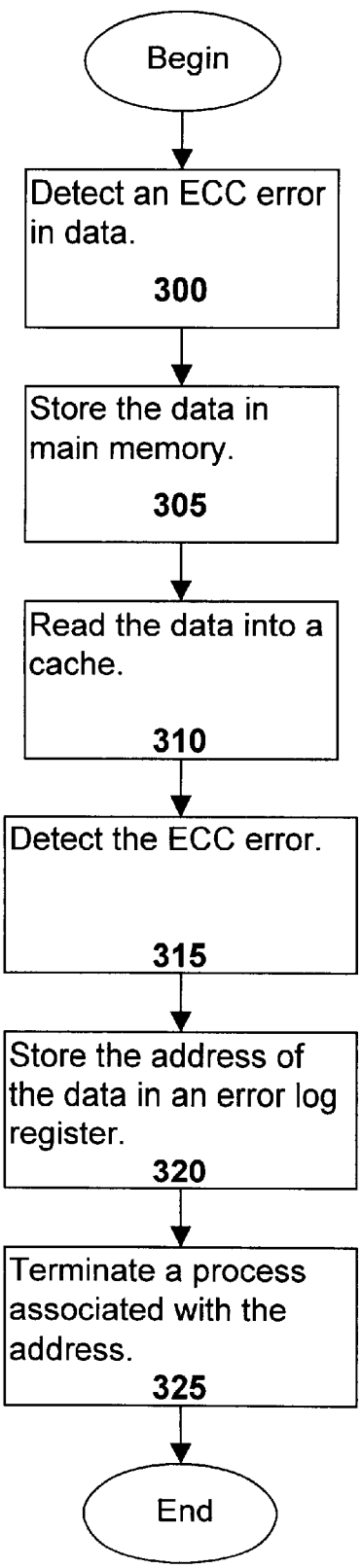
FIG. 3 is a flow chart showing a method of the present invention.

FIG. 3 is a flow chart showing a method of the present invention. At step 300 an uncorrectable, multi-bit, ECC error is detected in data. Notwithstanding the detection of this error, the data is stored in the main memory of the computer system at step 305. Alternatively, the error may be detected by and stored in a cache of the computer system. At step 310, the data is read from the main memory into a cache or other higher-level memory region of the computer system.

Subsequently, at step 315, the ECC error is detected by the processor using the processor's ECC unit. The data may be provided to the ECC unit of the processor upon an attempt by a process to load the data into a register file of the processor from a cache. In response to detecting the error, the address of the data is stored in an error log register of the processor at step 320.

Finally, at step 325, the process that attempted to load the data is terminated. This may be accomplished by asserting an MCA and calling the appropriate MCA handler that instructs the operating system to terminate the process. For another embodiment of the present invention, one or more other processes are also terminated if their memory space includes the address of the erroneous data stored in the error log register.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of handling data errors in a computer system comprising:
   detecting a multibit error in data;
   storing the data in a first cache while continuing to run first and second processes on the computer system, the first process being associated with the data;
   storing the data in a second cache while continuing to run the first and second processes on the computer system; and
   terminating the first process when the first process attempts to load the data from the second cache, while the second process continues to run.

2. The method of claim 1, wherein the first cache is at a higher level than the second cache.

3. The method of claim 1, wherein the first cache is at a lower level than the second cache.

4. The method of claim 1, further comprising storing an address of the data in a register after the first process attempts to load the data from the second cache and before terminating the first process.

5. The method of claim 4, wherein terminating the first process includes:
   asserting a machine check abort (MCA); and
   calling a MCA handler to instruct an operating system to terminate a process associated with the address stored in the register.

6. The method of claim 1, wherein detecting the multibit error using error correction code (ECC).

7. The method of claim 1, further comprising storing the data in a main memory of the computer system while continuing to run the first and second processes on the computer system.

8. A method of handling data errors in a computer system comprising:
- storing multibit, erroneous data in a first cache of a memory hierarchy of the computer system while continuing to run first and second processes on a processor of the computer system, the first process being associated with the data;
- evicting the data from the first cache to a next lower level of the memory hierarchy while continuing to run the first and second processes;
- transferring the data from the next lower level of the memory hierarchy back to the first cache while continuing to run the first and second processes; and
- terminating the first process upon attempting to load the data into a register file of the processor, while the second process continues to run.

9. The method of claim 8, wherein the first cache is external to the processor.

10. The method of claim 9, wherein the next lower level of the memory hierarchy is main memory of the computer system.

11. The method of claim 8, wherein the first cache is internal to the processor and the next lower level of the memory hierarchy is a second cache that is external to the processor.

12. The method of claim 8, wherein transferring the data is done in response to the first process loading the data.

13. The method of claim 8, wherein terminating the first process includes attempting to load the data into the register file from a third cache that is internal to the processor and has a cache level that is higher than a level of the first cache.

14. The method of claim 13, further comprising storing the data in the third cache while continuing to run the first and second processes.

15. The method of claim 8, further comprising storing an address of the data in a register of the processor after attempting to load the data into a register file of the processor and before terminating the first process.

16. The method of claim 15, wherein terminating the first process includes:
- asserting a machine check abort (MCA); and
- calling a MCA handler to instruct an operating system to terminate a process associated with the address of the data stored in the register of the processor.

17. A computer system comprising:
- main memory to store multibit, erroneous data;
- an external cache to store the data; and
- a processor to terminate a first process associated with the data while continuing to run a second process when the first process attempts to load the data into a register file.

18. The system of claim 17, wherein the processor includes an ECC unit to detect the multibit error in the data that is uncorrectable by the ECC unit.

19. The system of claim 18, wherein terminating the first process includes attempting to load the data into the register file from an internal cache.

20. The system of claim 19, wherein the processor includes an error log register to store an address associated with the data after detecting the error and before terminating the first process.

* * * * *